US010239357B2

(12) United States Patent
Vervaet et al.

(10) Patent No.: US 10,239,357 B2
(45) Date of Patent: Mar. 26, 2019

(54) TREAD FOR THE TIRE OF A FARM TRACTOR

(75) Inventors: Patrick Vervaet, Clermont-Ferrand (FR); Thierry Royer, Clermont-Ferrand (FR)

(73) Assignees: Compagnie Generale Des Etablissements Michelin, Clermont-Ferrand (FR); Michelin Recherche Et Technique S.A., Granges-Paccot (CH)

( * ) Notice: Subject to any disclaimer, the term of this patent is extended or adjusted under 35 U.S.C. 154(b) by 979 days.

(21) Appl. No.: 13/978,079

(22) PCT Filed: Jan. 4, 2012

(86) PCT No.: PCT/EP2012/050073
§ 371 (c)(1),
(2), (4) Date: Jul. 24, 2013

(87) PCT Pub. No.: WO2012/093131
PCT Pub. Date: Jul. 12, 2012

(65) Prior Publication Data
US 2013/0292019 A1    Nov. 7, 2013

(30) Foreign Application Priority Data
Jan. 6, 2011   (FR) ...................................... 11 50085

(51) Int. Cl.
*B60C 11/13* (2006.01)
*B60C 11/03* (2006.01)

(52) U.S. Cl.
CPC ......... *B60C 11/033* (2013.01); *B60C 11/0311* (2013.01); *B60C 11/1369* (2013.01); *B60C 2011/0313* (2013.01); *B60C 2200/08* (2013.01)

(58) Field of Classification Search
CPC ............... B60C 11/0311; B60C 11/033; B60C 2011/0313; B60C 11/0302;
(Continued)

(56) References Cited

U.S. PATENT DOCUMENTS

| 3,603,370 A | 9/1971 | Hylbert et al. |
| 4,383,567 A | 5/1983 | Crum et al. |

(Continued)

FOREIGN PATENT DOCUMENTS

| GB | 1 312 549 A | 4/1973 |
| HU | 210238 B * | 7/1995 |

(Continued)

OTHER PUBLICATIONS

Translation: HU 210238 B; Komocsi Istvan; no date.*

(Continued)

*Primary Examiner* — Kendra Ly
(74) *Attorney, Agent, or Firm* — Dickinson Wright PLLC

(57) ABSTRACT

A tread and tire for a multipurpose agricultural machine, that improves field traction while ensuring a satisfactory compromise with wear under engine torque and vibratory comfort on the road having a tread having a plurality of lugs distributed in a first row extending axially from a first axial end of the tread and in a second row extending axially from a second axial end of the tread, the second row differing from the first row by a symmetry relative to the equatorial plane of the tire followed by a rotation about the rotation axis of the tire, each row having an alternation of long lugs and of short lugs. The axially inner end face of a first long lug of a row of lugs is separated from the trailing lateral face of the second long lug of the symmetrical row of lugs, closest to the axially inner end face of the first long lug, by an end groove with a width at least equal to 10% and at most equal to 100% of the lug height.

17 Claims, 4 Drawing Sheets

(58) Field of Classification Search
CPC ............. B60C 11/1369; B60C 2200/06; B60C 2200/065; B60C 2200/08
USPC ............. 152/209.12, 209.28, 209.22, 209.13
See application file for complete search history.

(56) References Cited

U.S. PATENT DOCUMENTS

| | | | |
|---|---|---|---|
| 4,480,672 A | | 11/1984 | Marshall et al. |
| 4,534,392 A | | 8/1985 | Bonko et al. |
| 4,791,971 A | * | 12/1988 | Shinn ................. B60C 11/0311 152/209.12 |
| 5,046,541 A | | 9/1991 | Bonko |
| 5,411,067 A | * | 5/1995 | Beeghly ................... B60C 9/08 152/209.12 |
| 6,382,284 B1 | | 5/2002 | Bonko |

FOREIGN PATENT DOCUMENTS

| | | | |
|---|---|---|---|
| JP | 55148602 A | * | 11/1980 |
| JP | 59063201 A | * | 4/1984 |

OTHER PUBLICATIONS

International Search Report (PCT/ISA/210) dated Mar. 5, 2012, by the European Patent Office as the International Searching Authority for International Application No. PCT/EP2012/050073.

* cited by examiner

TREAD FOR THE TIRE OF A FARM TRACTOR

BACKGROUND

Field

The present invention relates to a tire for a heavy vehicle designed to run on various types of ground, and in particular the tread of such a tire.

Although not limited to this application, the invention will be more particularly described with reference to a multipurpose agricultural machine that can run just as well in the fields as on the road, such as an agricultural tractor.

Description of Related Art

A tire for an agricultural tractor is designed to run on various types of ground such as the more or less compact earth of fields, the unpaved tracks for access to the fields and the paved surfaces of roads. Because of the diversity of use, in the field and on the road, a tire for an agricultural tractor, and in particular its tread designed to come into contact with the ground, must have a performance compromise between field traction, resistance to tearing, resistance to wear on the road, rolling resistance, vibratory comfort on the road.

The trend of enlargement in the size of agricultural operations is leading to increasingly frequent use of agricultural tractors on the road and to an increase in their speed in road usage up to speeds that can achieve 40 km/h or even 65 km/h. This evolution in usage involves ever greater demands with respect to tire performance on the road such as wear resistance, rolling resistance and vibratory comfort. Wear resistance, under high engine torque, of a tire for a drive axle of an agricultural tractor is currently a demanding performance, considering the increase in mechanical power of agricultural tractors up to, for example, values of the order of 500 hp.

In general, a tire has a geometry of revolution about a rotation axis, and the geometry of the tire may be described in a meridian plane containing the rotation axis of the tire. For a given meridian plane, the radial, axial and circumferential directions designate respectively the directions perpendicular to the rotation axis of the tire, parallel to the rotation axis of the tire and perpendicular to the meridian plane. In the following, the expressions "radially inner" and "radially outer" mean respectively "closer to the rotation axis of the tire, in the radial direction" and "further from the rotation axis of the tire, in the radial direction". The expressions "axially inner" and "axially outer" mean respectively "closer to the equatorial plane, in the axial direction" and "further from the equatorial plane, in the axial direction", the equatorial plane being the plane perpendicular to the rotation axis of the tire and passing through the middle of the tread surface of the tire.

In general, a tire comprises a crown comprising a tread designed to come into contact with the ground via a tread surface, two beads designed to come into contact with a rim and two sidewalls connecting the crown to the beads. A tire for an agricultural tractor, comprises a carcass reinforcement, anchored in each bead, usually consisting of at least one layer of textile reinforcing elements, the said reinforcing elements being substantially parallel with one another in the layer and being able to be substantially radial, that is to say substantially perpendicular to the circumferential direction, and/or crossed from one layer to the next while forming equal or different angles with the circumferential direction. The carcass reinforcement is usually surmounted radially externally by a crown reinforcement consisting of at least two working crown layers consisting of textile or metal reinforcing elements crossed from one layer to the next while forming slight angles with the circumferential direction.

The tread, during the rotation of the tire, comes into contact with the ground via a tread surface. The tread surface comprises two axial ends which are the axially outermost points of the said surface coming into contact with the ground. The axial distance, measured parallel to the rotation axis of the tire between the two axial ends of the tread surface, defines the tread width.

The tread generally comprises a plurality of protruding elements or lugs, of elongate parallelepipedal shape consisting of at least one rectilinear or curvilinear portion, and separated by furrows.

In the radial direction, a lug extends between an inner surface of revolution about the rotation axis of the tire and the tread surface, the radial distance between the inner surface and the tread surface defining the lug height. The radially outer face of the lug, belonging to the tread surface, which comes into contact with the ground when the lug passes in the area of contact of the tire, is called the contact face of the lug.

In the axial direction, a lug extends between an axially outer end face and an axially inner end face.

In the circumferential direction, a lug extends between a leading lateral face and a trailing lateral face. The leading lateral face is the face of which the radially outer ridge, the intersection of the said face with the tread surface, or leading edge is the first to come into contact with the ground when the lug enters the contact area of the tire with the ground, during the rotation of the tire. The trailing lateral face is the face of which the radially outer ridge, the intersection of the said face with the tread surface, or trailing edge is the last to come into contact with the ground when the lug enters the area of contact of the tire with the ground during the rotation of the tire.

A lug usually has an average angle of inclination relative to the circumferential direction, close to 45°. The average angle of inclination is the angle of the straight line passing through the respectively axially outer and inner ends of the centre line of the contact face, the centre line being all of the points of the contact face that are equidistant from the leading and trailing edges.

The tread of a tire for an agricultural tractor usually comprises two rows of lugs as described above. This distribution of lugs inclined relative to the circumferential direction confers on the tread a V shape normally called a chevron pattern. The two rows of lugs have a symmetry relative to the equatorial plane of the tire, most frequently with a circumferential offset between the two rows of lugs, resulting from a rotation about the axis of the tire of one half of the tread relative to the other half of the tread. Moreover, the lugs may be continuous or discontinuous, and distributed circumferentially with a constant or variable pitch.

Document U.S. Pat. No. 4,383,567 describes a tread for a tire of an agricultural tractor, comprising an alternation of long lugs and short lugs. According to this document, a long lug, of which the axial distance between ends is greater than half the axial width of the tread, consists of three rectilinear portions, whereas a short lug, of which the axial distance between ends is less than half the axial width of the tread, consists of two rectilinear portions. Document U.S. Pat. No. 4,534,392 proposes a variant of the foregoing solution in which a combination of two long lugs in succession alternates with one short lug. The advantage of such treads is to improve comfort of running on the road without reducing the traction performance in the field. However, these solutions have the drawback of causing more rapid wear of the short lugs relative to the long lugs, leading to irregular wear of the tread and the premature removal of the tire.

Documents U.S. Pat. No. 5,046,541 and U.S. Pat. No. 5,411,067 describe respectively discontinuous short lugs and long lugs which substantially improve the problem of irregular wear mentioned above. The drawback of these solutions is that they lead to more rapid wear of the tire, which is a cause of premature removal of the tire.

Document U.S. Pat. No. 6,382,284 aims to improve the compromise between traction and wear by proposing a dissymmetrical tread, with short lugs at the shoulder and protruding elements at the centre performing the function of the long lugs of the solutions previously described. The dissymmetry of the design has the drawback of a fitting constraint between the left and right sides of the axle of the agricultural tractor. The speed of wear at the centre of the tread is also increased because of the dissymmetry of the design, hence a reduction in the period of use of the tire.

SUMMARY

The object of the present invention is to improve the field traction of a tire for a drive axle of a multipurpose agricultural machine, that can run just as well in the fields as on the road, such as an agricultural tractor, while ensuring a satisfactory compromise with wear under engine torque and vibratory comfort on the road.

This object has been achieved according to embodiment of the invention by a tire for a multipurpose agricultural machine, comprising:

a tread designed to come into contact with the ground via a tread surface having two axial ends, the axial distance between the axial ends being the width of the tread, the tread comprising a plurality of lugs extending radially between an inner surface of revolution about the rotation axis of the tire and the tread surface, the radial distance between the said surfaces being the lug height, each lug comprising a leading lateral face, a trailing lateral face, an axially outer end face, an axially inner end face and a contact face, the plurality of lugs being distributed in a first row of lugs extending axially from a first axial end of the tread and a second row of lugs extending axially from a second axial end of the tread, the second row of lugs differing from the first row of lugs by a symmetry relative to the equatorial plane of the tire followed by a rotation about the rotation axis of the tire, each row of lugs consisting of an alternation of long lugs, of which the axial distance between the respectively axially outer and inner end faces is at least equal to half the width of the tread, and of short lugs, of which the axial distance between the respectively axially outer and inner end faces is at most equal to half the width of the tread, the axially inner end face of a first long lug of a row of lugs being separated from the trailing lateral face of the second long lug of the symmetrical row of lugs, closest to the axially inner end face of the first long lug, by an end groove with a width at least equal to 10% and at most equal to 100% of the lug height.

The plurality of lugs forming the tread is distributed in a first row of lugs extending axially from a first axial end, or first edge, of the tread and a second row of lugs extending axially from a second axial end, or second edge, of the tread. The second row of lugs differs from the first row of lugs by a symmetry relative to the equatorial plane of the tire passing through the middle of the tread and perpendicular to the rotation axis of the tire, followed by a rotation about the rotation axis of the tire. In other words, the second row of lugs consists of lugs identical to those of the first row, placed as a mirror image of those of the first row but offset circumferentially. This configuration of the first and second rows of lugs confers chevron or offset-V patterns on the tread.

Each row of lugs also consists of an alternation of long lugs and short lugs. A lug is called long when the axial distance, measured parallel to the rotation axis of the tire, between the respectively axially outer and inner end faces, or more precisely between the centres of the said end faces, is at least equal to half the tread width. For a long lug of which the axially outer end face is positioned at an axial end or edge of the tread, this means that the axially inner end face of the said long lug is positioned beyond the equatorial plane. A lug is called short when the axial distance, measured parallel to the rotation axis of the tire, between the respectively axially outer and inner end faces, or more precisely between the centres of the said end faces, is at most equal to half the tread width. For a short lug of which the axially outer end face is positioned at an axial end or edge of the tread, this means that the axially inner end face of the said short lug is positioned short of the equatorial plane.

According to the invention, the axially inner end face of a first long lug of a row of lugs is advantageously separated from the trailing lateral face of the second long lug of the symmetrical row of lugs, closest to the axially inner end face of the first long lug, by an end groove with a width at least equal to 10% and at most equal to 100% of the lug height.

The end groove is delimited by the axially inner end face of a first long lug of a row of lugs and by the trailing lateral face of the second long lug of the symmetrical row of lugs, closest to the axially inner end face of the first long lug. The width of the end groove is the distance between the respective ridges of intersection of these two faces with the tread surface. Given a width of the end groove of between 10% and 100% of the lug height, when entering the area of contact of the tire, the two faces of the end groove come into contact. The closure of the end groove thus ensures a structural continuity between the two long lugs delimiting the end groove, hence a stiffening of the inner axial end of the first long lug. If consideration is given to all the long lugs in the area of contact of the tire, a structural continuity is seen between the long lugs, in their axially inner portions, and a partitioning of the central portion of the tread by the long lugs.

The partitioning of the central portion of the tread by the long lugs allows an optimized shearing of the earth contained in the cells of the partition, which causes an improvement in the attraction capability of the tire in the field.

The increase in the circumferential rigidity at the centre of the tread resulting from the stiffening of the axially inner ends of the long lugs causes an improvement in the wear resistance under torque of the tire, when used outside the field.

Finally, the structural continuity of the long lugs at the centre of the tread ensures vibrational comfort in use outside the field.

According to a first embodiment of the invention, the end groove between the axially inner end face of a first long lug of a row of lugs and the trailing lateral face of a second long lug of the symmetrical row of lugs, closest to the axially inner end face of the first long lug, extends radially between the inner surface and the tread surface of the tread.

In other words, the end groove advantageously extends radially over the whole height of the lug, which creates a complete articulation between the axially inner end face of the first long lug and the trailing lateral face of the second long lug, hence an easier flattening of the tread in the area of contact with the ground.

According to a second embodiment of the invention, the end groove between the axially inner end face of a first long lug of a row of lugs and the trailing lateral face of a second long lug of the symmetrical row of lugs, closest to the axially inner end face of the first long lug, is at least partly filled by an elastomeric linking element extending radially outwards from the inner surface of the tread.

The presence of an elastomeric linking element in the end groove involves an articulation between the axially inner end face of the first long lug and the trailing lateral face of the second long lug that is less complete than in the first embodiment. On the other hand, compared with the first embodiment, because of the presence of the elastomeric linking element at the bottom of the groove, the stiffening of the axially inner ends of a long lug is greater and the partitioning of the tread by the long lugs is more effective. The elastomeric linking element also ensures a better resistance to tearing of the axially inner ends of the long lug.

In the second embodiment, the radial height of the elastomeric linking element, defined between the inner surface of the tread and the radially outer face of the elastomeric linking element, is advantageously at most equal to 75% of the lug height. Correlatively, the effective depth of the end groove, defined between the tread surface and the radially outer face of the elastomeric linking element, is at least equal to 25% of the lug height. The linking element makes it possible to mechanically stiffen the axially inner end face of the first long lug, while the end groove makes it possible to penetrate the ground in the field. This design choice is therefore a compromise between the mechanical stiffening and the protection against tearing of the axially inner end of a long lug and its ability to penetrate the earth, when used in the field.

It is advantageous that the axial distance between the respectively axially outer and inner end faces of a long lug is at most equal to 70% of the tread width. In other words, the axial distance between the respectively axially outer and inner end faces of a long lug is between 50% and 70% of the tread width. This design constraint ensures the geometric compatibility of the lugs of a given row with the short lugs of the symmetrical row.

The axial distance between the respectively axially outer and inner end faces of a short lug is advantageously at least equal to 20% of the tread width. Short of 20% of the tread width, the short lug has an insufficient axial width to participate effectively in traction in the field. Moreover, too short a lug is mechanically weaker and sensitive to tearing.

The axial distance between the respectively axially outer and inner end faces of a short lug is again advantageously at most equal to 40% of the tread width. Beyond 40% of the tread width, the short lug has too great an axial width that is likely to cause a geometric incompatibility with the long lugs of the symmetrical row.

Irrespective of the type of lug, the angle of inclination of the tangent to the centre line of the contact face of a lug at the axially outer end point of the said centre line, relative to the circumferential direction, is at least equal to 45° and at most equal to 90°, and preferably at least equal to 50° and at most equal to 75°. An angle at least equal to 45° and at most equal to 90°, and preferably at least equal to 50° and at most equal to 75°, means more of a radial orientation of the lug at the tread edge, which is favourable for good traction capability in the field.

In the case of a long lug, the angle of inclination of the tangent to the centre line of the contact face of a long lug at the axially inner end point of the said centre line, relative to the circumferential direction, is at least equal to 15° and at most equal to 45°, and preferably at least equal to 25° and at most equal to 35°. Such a range of angles of inclination ensures more of a circumferential orientation of the long lug in the vicinity of the centre of the tread, for the purpose of increasing the circumferential rigidity, and hence of improving the wear at the centre under torque and vibratory comfort.

For a long lug, it is also advantageous that the average angle of inclination of the straight line passing through the respectively axially outer and inner end points of the centre line of the contact face of the long lug, relative to the circumferential direction, is at least equal to 40° and at most equal to 60°. This average angle of inclination of the lug allows a compromise between the performance of traction in the field, of wear on the road and of vibratory comfort.

An advantageous variant of the preceding embodiments is that each long lug comprises at least one inner groove between its respectively axially outer and inner end faces. This at least partial discontinuity creates an articulation in the long lug which facilitates its flattening when it enters the contact area.

For optimal operation, an inner groove of a long lug has a width at most equal to 100% of the lug height, so that the inner groove can close when the long lug enters the contact area.

The radial depth of an inner groove of a long lug is at least equal to 25% of the lug height. This radial depth is the radial distance measured between the tread surface at the bottom of the groove. The radial depth must have a minimum value in order to produce the effect of local articulation of the long lug.

A single inner groove is a priori sufficient to produce the effect of local articulation of the long lug. Several inner grooves would be likely to diminish the rigidity of the long lug, and to make it less effective in traction and more sensitive to tearing.

Finally, the axial distance of the inner groove of a long lug of a row of lugs is advantageously equal to the axial distance of the inner end face of a short lug of the same row of lugs. The axial distance of the inner groove is the axial distance between the mid-plane of the inner groove, perpendicular to the centre line of the contact face, and the equatorial plane of the tire. In other words, the inner groove of a long lug is positioned axially level with the respective axially inner faces of the short lugs of the same row positioned on either side of the long lug in question. Everything happens as if the long lug had an intermediate axially inner end face coinciding with the axially inner end faces of the adjacent short lugs, which has a favourable effect for countering irregular wear of the short lugs.

BRIEF DESCRIPTION OF THE DRAWINGS

The present invention will be better understood with the aid of FIGS. 1 to 4 explained below:

FIG. 1 shows a view in perspective of a tire 1 according to the invention, comprising a tread 2 designed to come into contact with the ground via a tread surface 3. The tread 2 comprises a plurality of lugs (15, 16, 25, 26) extending radially between an inner surface 4 of revolution about the rotation axis of the tire and the tread surface 3. Each lug (15, 16) comprises a leading lateral face (151, 161), a trailing lateral face (152, 162), an axially outer end face (153, 163), an axially inner end face (154, 164), and a contact face (155, 165). The plurality of lugs is distributed in a first row of lugs (15, 16) and a second row of lugs (25, 26) extending axially respectively from a first axial end and from a second axial end of the tread. Each row of lugs consists of an alternation of long lugs (15, 25) and short lugs (16, 26). According to the invention, the axially inner end face (154) of a first long lug (15) of a row of lugs is separated from the trailing lateral face (252) of the second long lug (25) of the symmetrical row of lugs, closest to the axially inner end face of the first long lug, by an end groove (156).

FIG. 2 shows the tread surface of a tire 1 according to the invention, opened out in a plane (X, Y), that is to say the contact faces of the long lugs (15, 25) and of the short lugs (16, 26). FIG. 2 repeats the elements of FIG. 1, with two additional elements: the elastomeric linking element 157 extending radially in the end groove 156, and an inner groove 158 positioned in the long lug 15, between its respectively axially outer end face 153 and inner end face 154.

FIG. 3 shows the geometric parameters of the tread surface, according to the invention. The tread surface comprises two axial ends, the axial distance between the axial ends being the tread width L. The tread 2 comprises a plurality of lugs distributed in a first row of lugs (15, 16) extending axially from a first axial end of the tread and a second row of lugs (25, 26) extending axially from a second axial end of the tread, the second row of lugs (25, 26) differing from the first row of lugs (15, 16) by a symmetry relative to the equatorial plane (P) of the tire followed by a rotation about the rotation axis (Y) of the tire. Each row of lugs consists of an alternation of long lugs 15, of which the axial distance $L_1$ between the respectively axially outer and inner end faces (153, 154) is at least equal to half the tread width L, and of short lugs 16, of which the axial distance $L_2$ between the respectively axially outer and inner end faces (163, 164) is at most equal to half the tread width L.

DETAILED DESCRIPTION OF SPECIFIC EMBODIMENTS

Figure 1:
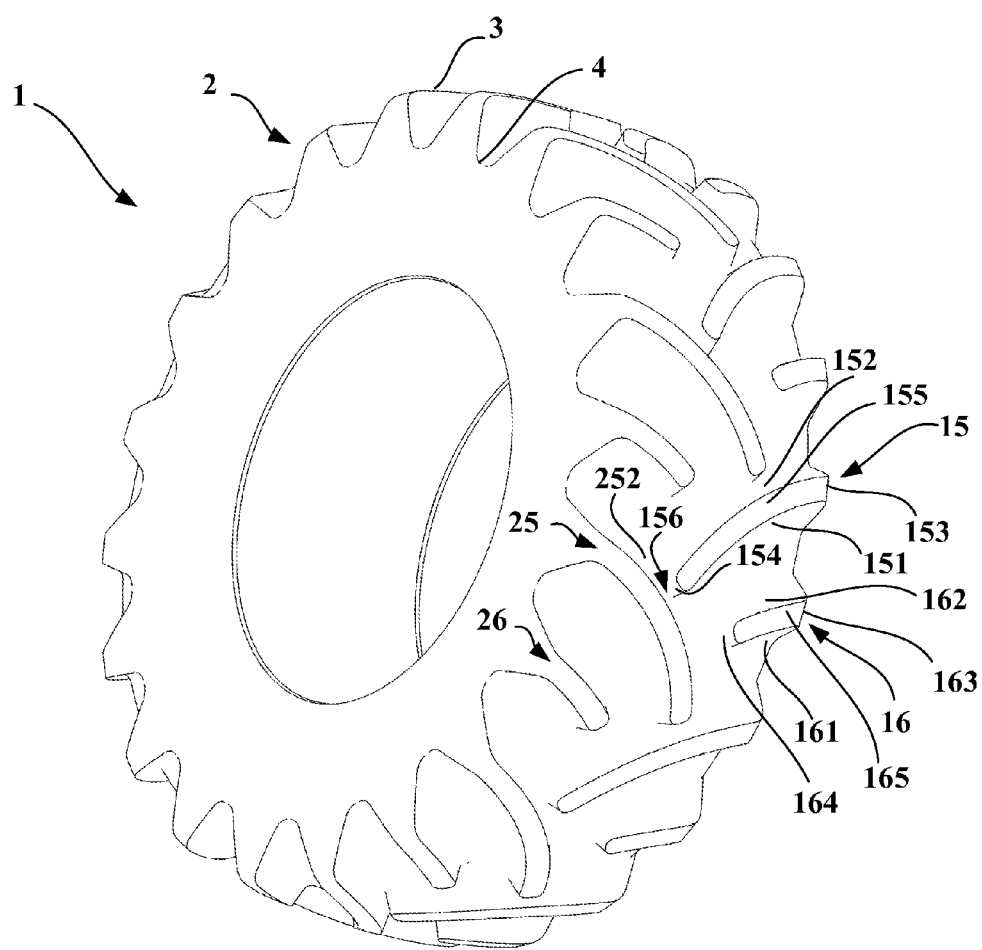
FIG. 1 shows a view in perspective of a tire according to the invention.
Figure 2:
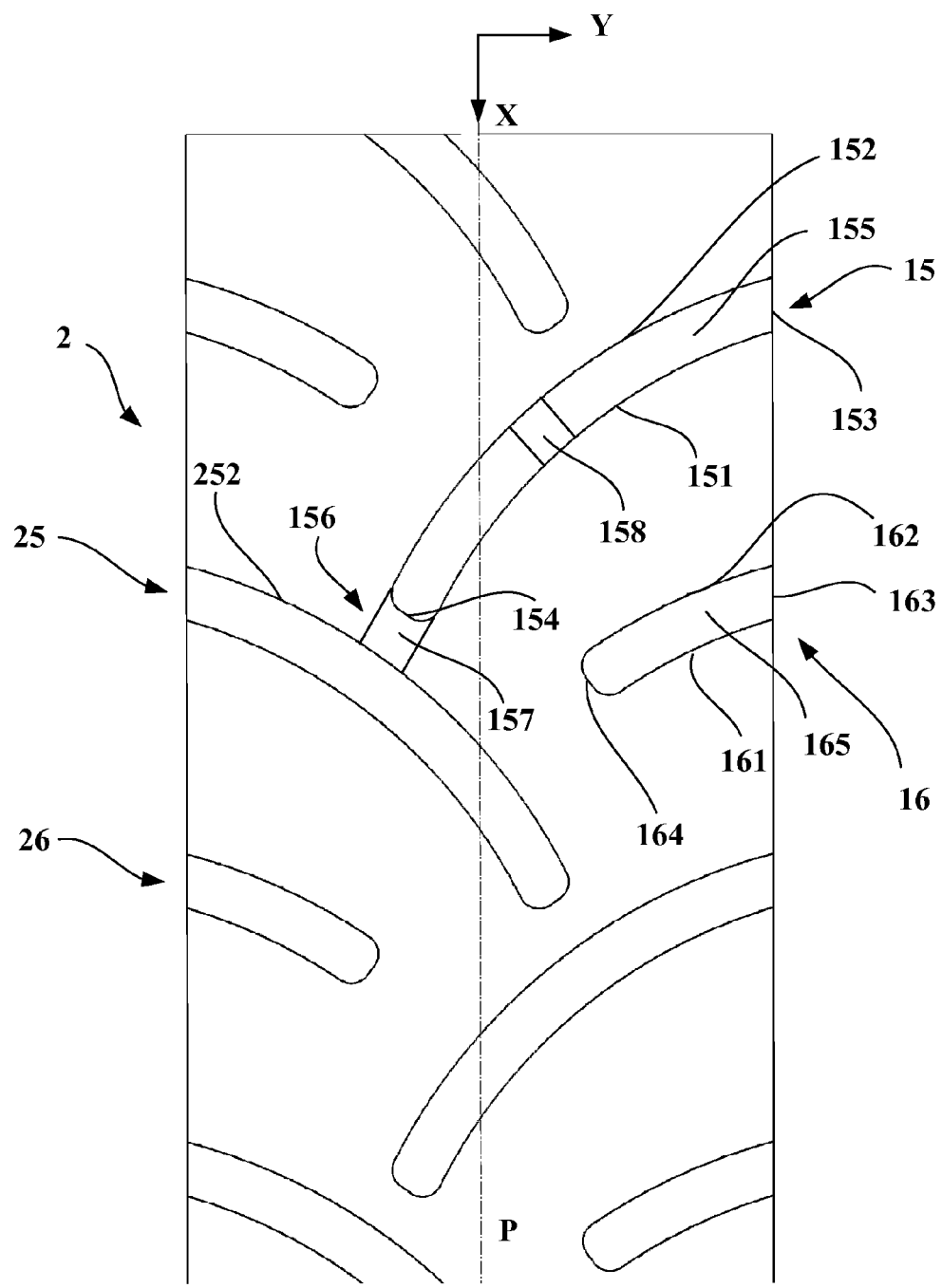
FIGS. 2 and 3 show the tread surface of a tire according to the invention opened out in a plane.

According to the invention, the axially inner end face 154 of a first long lug 15 of a row of lugs is separated from the trailing lateral face 252 of the second long lug 25 of the symmetrical row of lugs, closest to the axially inner end face of the first long lug, by an end groove 156 with a width e at least equal to 10% and at most equal to 100% of the lug height.

Figure 3:
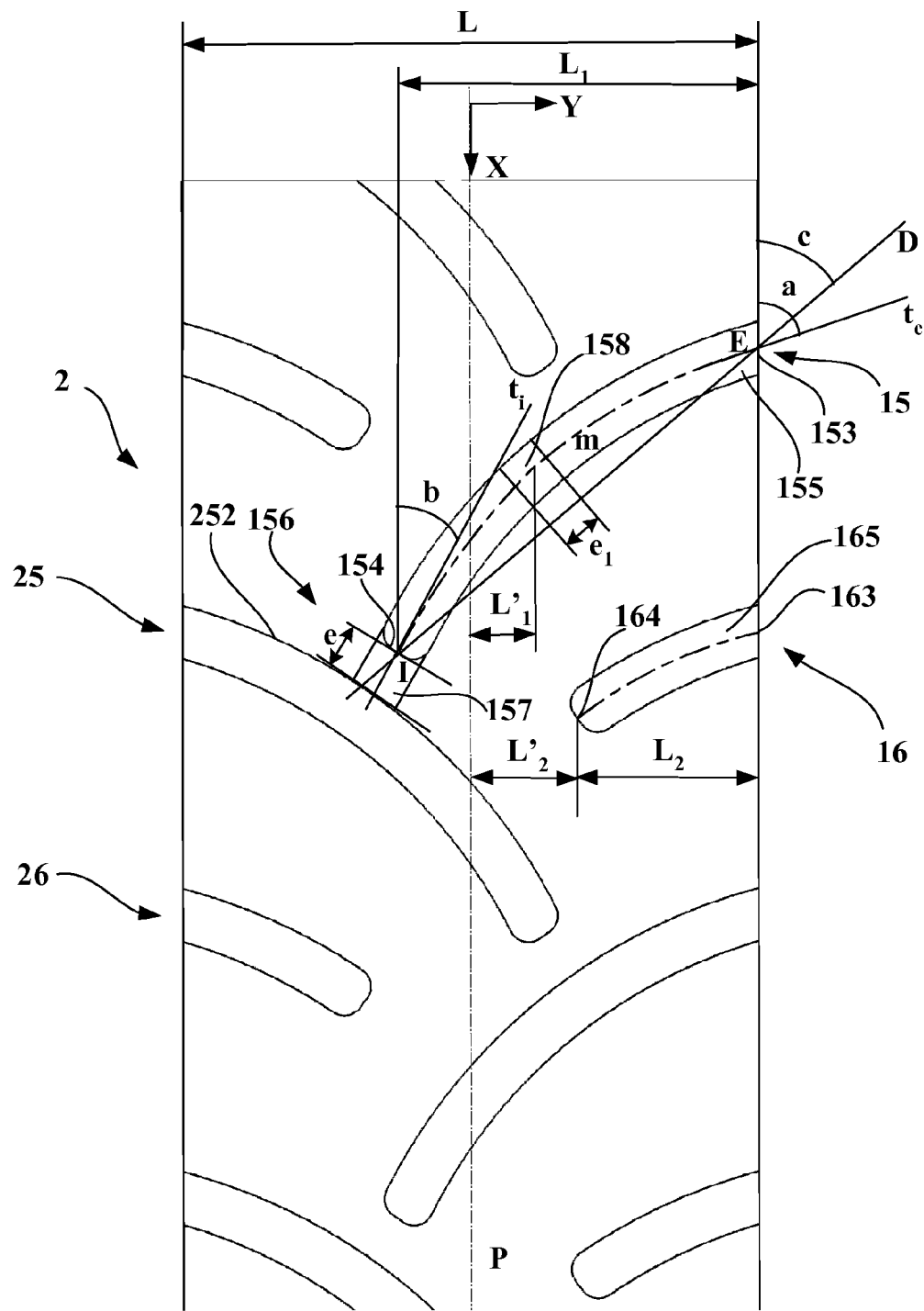

In the embodiment of FIG. 3, the end groove 156 is at least partly filled by an elastomeric linking element 157 extending radially from the inner surface 4 of the tread. Moreover, the long lug 15 comprises a single inner groove 158, with a width $e_1$ and an axial distance $L'_1$ relative to the equatorial plane P.

The contact face (155, 165) of a lug is moreover defined geometrically by its centre line m limited by the axially outer end point E and the axially inner end point I. The geometric line of the centre line m is characterized by:

the angle of inclination a of the tangent $t_e$ to the centre line m at the axially outer end point E, relative to the circumferential direction X, the angle of inclination b of the tangent $t_i$ to the centre line m at the axially inner end point I, relative to the circumferential direction X, the average angle of inclination c of the straight line D passing through the respectively axially outer end point E and inner end point I, relative to the circumferential direction X.

Figure 4:
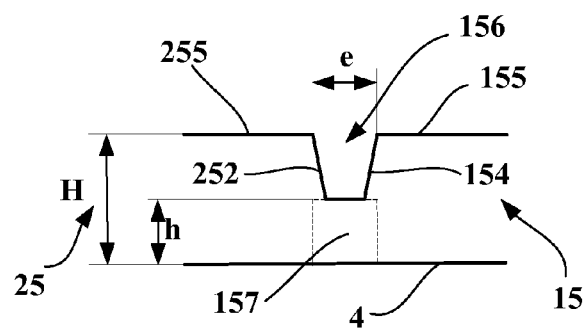
FIG. 4 shows a section of an end groove of a long lug.

FIG. 4 shows a section of an end groove 156, made along a mid-plane, tangential to the centre line of the contact face 155 at its axially inner end. The end groove 156, with a width e, separates the axially inner end face 154 of the long lug 15 from the trailing lateral face 252 of the long lug 25. The width e of the end groove 156 is defined at the respective contact faces (155, 255) of the long lugs 15 and 25. The end groove 156 extends radially between the inner surface 4 and the contact faces (155, 255) over the lug height H and is at least partly filled by the linking element 157 which extends radially from the inner surface 4 over a radial height h at most equal to 75% of the lug height H.

Figure 5:
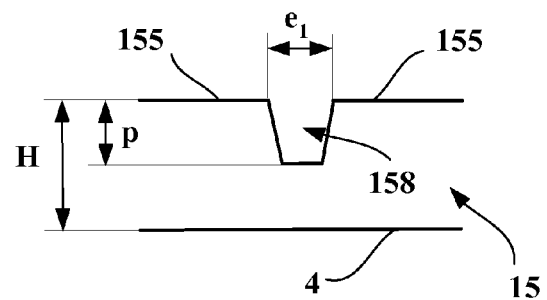
FIG. 5 shows a section of an inner groove of a long lug.

FIG. 5 shows a section of an inner groove 158, made on a mid-plane, tangential to the centre line of the contact face 155. The inner groove 158, with a width $e_1$, is positioned in a long lug 15. The width $e_1$ of the inner groove 158 is defined at the contact face 155 of the long lug 15. The groove 158 extends radially from the contact face 155, over a radial depth p at least equal to 25% of the lug height H, the radial distance between the inner surface 4 and the contact face 155.

The invention has been most particularly studied for an agricultural tire of 600/65 R 38 dimension, in the case of the second embodiment of the invention with an end groove partially filled by an elastomeric linking element, but with no intermediate groove. For this studied dimension, the tread width L is equal to 586 mm, the lug height H is equal to 60 mm, the axial distance $L_1$ between the respectively axially outer and inner end faces of a long lug is equal to 365.5 mm and the axial distance $L_2$ between the respectively axially outer and inner end faces of a short lug is equal to 184 mm. The width e of the end groove is equal to 48 mm and the height h of the elastomeric linking element is equal to 5 mm. With respect to the orientation of a long lug, the angles a, b and c are respectively equal to 75°, 25° and 49.5°.

The inventors have compared the wear performance under torque and in traction, in the field, of the tire being studied, described above, and a benchmark tire. The benchmark tire comprises a tread, comprising two rows of lugs that are identical to one another, that is to say all having the same axial distance between their respectively axially outer and inner end faces, and placed in chevrons, the total volume of lugs being equal to that of the tire being studied. The gain in performance on wear under engine torque of the tire being studied relative to the benchmark tire is estimated at 20%, which produces an additional service life of the tire of 20%, for a total volume of lugs, that is to say a given volume of rubber to be worn. The gain in traction performance, in the field, of the tire being studied relative to the benchmark tire is estimated at 10%, which means an increase in traction capability of 10%, for a given force of slippage of the tire relative to the ground.

The present invention can be extended to other treads, comprising more than two rows of lugs. As an example, the tread may comprise, in addition to the two rows of lugs extending axially respectively from a first axial end and a second axial end of the tread, a row of inner lugs forming a middle portion of the tread and not emerging on an axial end of the tread.

The invention claimed is:

1. A tire for a multipurpose agricultural machine, comprising:
   a tread designed to come into contact with the ground via a tread surface having two axial ends, the axial distance between the axial ends being the width of the tread (L),
   the tread comprising a plurality of lugs extending radially between an inner surface of revolution about the rotation axis of the tire and the tread surface, the radial distance between the said surfaces being the lug height (H),
   each lug comprising a leading lateral face, a trailing lateral face, an axially outer end face, an axially inner end face and a contact face,
   the plurality of lugs being distributed in a first row of lugs extending axially from a first axial end of the tread and a second row of lugs extending axially from a second axial end of the tread, the second row of lugs being identical to the first row of lugs and placed as a mirror image of the first row of lugs that is offset in the circumferential direction of the tire,
   each row of lugs consisting of an alternation of long lugs, of which an axial distance ($L_1$) between the respectively axially outer and inner end faces is at least equal to half the width of the tread (L), and of short lugs, of which an axial distance ($L_2$) between the respectively axially outer and inner end faces is at most equal to half the width of the tread (L),
   wherein the axially inner end faces of a plurality of first long lugs of the first row of lugs are separated from the trailing lateral faces of a plurality of second long lugs of the second row of lugs, closest to the axially inner end faces of the plurality of first long lugs, by an end groove with a width (e) at least equal to 10% and at most equal to 100% of the lug height (H), and
   wherein the end groove between the axially inner end face of at least one first long lug of the plurality of first long lugs and the trailing lateral face of at least one second long lug of the plurality of second long lugs, closest to the axially inner end face of the at least one first long lug, includes an elastomeric linking element extending radially outwards from the inner surface of the tread between the axially inner end face of the at least one first long lug and the trailing lateral face of the at least one second long lug having a radial height (h),
   wherein the entire elastomeric linking element is spaced from the equatorial plane,
   wherein each of the first and second long lugs connecting to an elastomeric linking element comprises at least one inner groove between its respectively axially outer end face and inner end face.

2. The tire according to claim 1, wherein the end groove between the axially inner end face of at least one first long lug and the trailing lateral face of at least one second long lug, closest to the axially inner end face of the at least one first long lug, extends radially between the inner surface of revolution about the rotation axis of the tire and the tread surface of the tread.

3. The tire according to claim 1, wherein the radial height (h) of the elastomeric linking element is at most equal to 75% of the lug height (H).

4. The tire according to claim 1, wherein the axial distance ($L_1$) between the respectively axially outer end face and inner end face of each long lug is at most equal to 70% of the tread width (L).

5. The tire according to claim 1, wherein the axial distance ($L_2$) between the respectively axially outer end face and inner end face of each short lug is at least equal to 20% of the tread width (L).

6. The tire according to claim 1, wherein the axial distance ($L_2$) between the respectively axially outer end face and inner end face of each short lug is at most equal to 40% of the tread width (L).

7. The tire according to claim 1, wherein an angle of inclination (a) of a tangent ($t_e$) to a centre line (m) of the contact face of each lug at an axially outer end point (E) of the said centre line, relative to the circumferential direction (X), is at least equal to 45° and at most equal to 90°.

8. The tire according to claim 7, wherein the angle of inclination (a) is at least equal to 50° and at most equal to 75°.

9. The tire according to claim 1, wherein an angle of inclination (b) of a tangent ($t_1$) to a centre line (m) of the contact face of each long lug at an axially inner end point (I) of the said centre line, relative to the circumferential direction (X), is at least equal to 15° and at most equal to 45°.

10. The tire according to claim 9, wherein the angle of inclination (b) is at least equal to 25° and at most equal to 35°.

11. The tire according to claim 1, wherein an average angle of inclination (c) of a straight line (D) passing through the respectively axially outer end point (E) and inner end point (I) of a centre line (m) of the contact face of each long lug, relative to the circumferential direction (X), is at least equal to 40° and at most equal to 60°.

12. The tire according to claim 1, wherein the at least one inner groove has a width ($e_1$) at most equal to 100% of the lug height (H).

13. The tire according to claim 1, wherein a radial depth (p) of the at least one inner groove is at least equal to 25% of the lug height (H).

14. The tire according to claim 1, wherein each long lug comprises only one inner groove between its respectively axially outer end face and inner end face.

15. The tire according to claim 14, wherein the inner groove of each long lug is disposed at an equal axial distance to the equatorial plane as the axially inner end face of a short lug of the same row of lugs.

16. The tire according to claim 1, wherein a distance in the contact face of each lug measured between the leading lateral face and the trailing lateral face is constant along the entire length of each respective lug.

17. The tire according to claim 16, wherein each elastomeric linking element extends at a distance from the leading lateral face to the trailing lateral face of the at least one first long lug in the plurality of first long lugs that remains constant along the entire width (e) of each respective end groove.

* * * * *